June 1, 1926.

R. CONRADER

RADIATOR COOLER

Filed April 17, 1925

1,587,284

2 Sheets-Sheet 1

Inventor
Rudolph Conrader

By
Attorney

June 1, 1926.
R. CONRADER
1,587,284
RADIATOR COOLER
Filed April 17, 1925    2 Sheets-Sheet 2
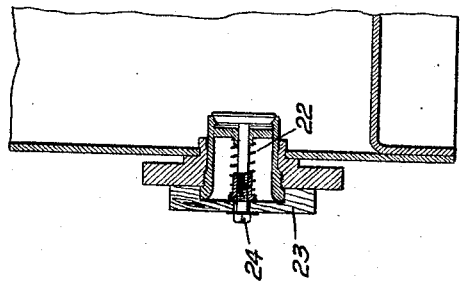
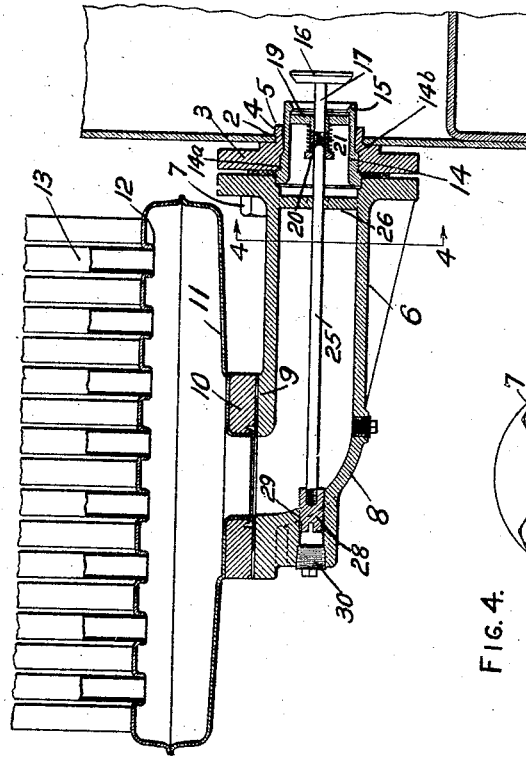
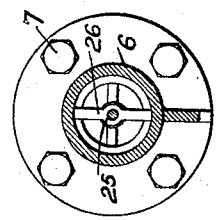
Inventor
Rudolph Conrader
By H. E. Lowe
Attorney Patented June 1, 1926.

1,587,284

UNITED STATES PATENT OFFICE.

RUDOLPH CONRADER, OF ERIE, PENNSYLVANIA.

RADIATOR COOLER.

Application filed April 17, 1925. Serial No. 23,751.

This invention is designed to improve transformer coolers. Such transformers are usually formed of a tank which is adapted to receive the transformer mechanism and a series of radiators attached to the tank for cooling the oil in which the transformer elements are immersed. It is desirable to remove these radiators during the shipment of the transformer and also desirable to have the tank and its parts filled with oil during its shipment. It is also desirable, under certain conditions, to remove the radiator, or cut off certain radiators from the tank during its operation. The present invention provides a valve mechanism for controlling the opening through which the radiators are connected. This valve mechanism is so arranged that it may be readily locked and housed for shipment and opened after the attachment of the radiator, the same valve mechanism being useful for cutting off the radiator at any time that it may be desired either for removal of the radiator or for simply cutting the radiator out of the circulation. Features and details of the invention will appear from the specification and claims.

The invention is illustrated in the accompanying drawings as follows:—

Figure 1:
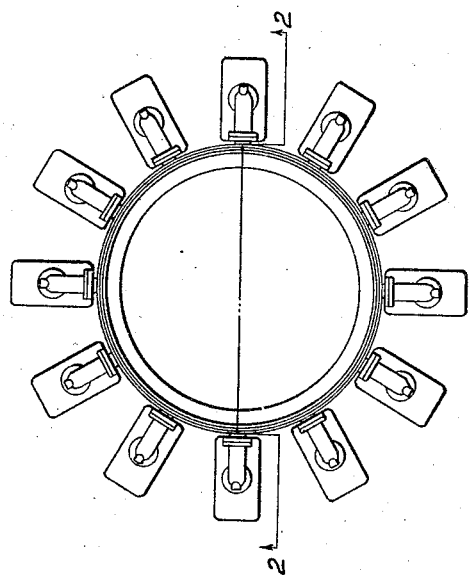

Fig. 1 shows a plan view of the cooler.

Figure 2:
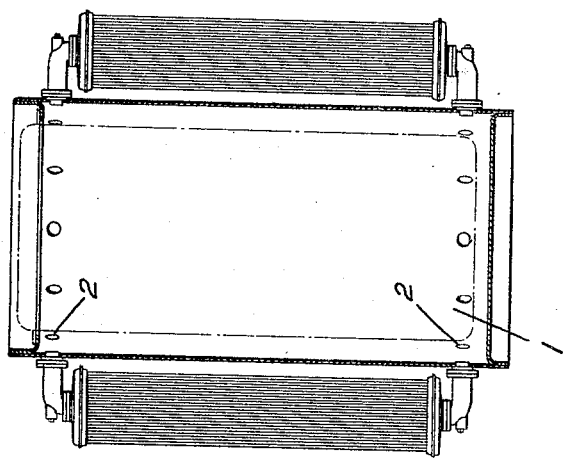

Fig. 2 a section on the line 2—2 in Fig. 1.

Fig. 3 an enlarged sectional view of one of the connections between the radiator and tank.

Fig. 4 a section on the line 4—4 in Fig. 3.

Fig. 5 a sectional view of one of the radiator openings closed for shipment.

1 marks the cooler tank, and 2 openings, top and bottom, leading radially from the tank.

A flanged fitting 3 has a projection 4 which is passed through an opening 2 and expanded at 5 so as to seal the connection between the flanged fitting and secure the same to the wall of the transformer tank. A flanged fitting 6 is secured by screws 7 to the flanged fitting 3 and this is in the form of an elbow having the turn 8 terminating in a flanged face 9. A flange 10 on the radiator head 11 is secured to the elbow fitting 6 on the flanged face 9. The head has the tube openings 12 and the radiator tubes 13 are arranged in the openings 12. Exactly the same shaped headers and connections are arranged at the top and bottom of the radiators and operate in the same manner. As the oil of the tank becomes heated it passes by gravity from the tank out of the upper openings in the tank to the radiator and as it is cooled descends and returns to the tank, thus creating a circulation through the radiator.

A valve fitting 14 is screwed into the flanged fitting 3 and has a valve seat 15 at its inner end. A valve 16 operates on the seat 15. It is provided with a stem 17 which extends outwardly and slidingly through a spider 19. A head 20 having an internal screw-threaded opening 21 is screwed on to the end of the stem 17 and a spring 22 is arranged between the head and the spider 19 and tends to close the valve on the seat 15.

When it is desired to ship the tank a closure block 23 is arranged over the valve fitting 14 and seated on the flanged fitting 3. A screw 24 extends through the center of the block 23 and into the screw-threaded opening 21, thus locking the block 23 in place and at the same time locking the valve in closed position.

After the transformer is installed and it is desired to attach the radiators the elbow fitting 6 is secured to the flanged fitting 3. A rod 25 extends through a spider 26 at the inner end of the elbow fitting and is concentric with the stem 17 so that when it is advanced against the stem 17 it will force the valve 15 from its seat. The outer end of the rod 25 is secured in a screw 28 which operates in a screw-threaded opening 29 in the turn of the elbow fitting. The screw is provided with a notched end by means of which it may be readily turned to force the rod inwardly, or outwardly, so as to open the valve, or permit the valve to close. Thus the radiators may be attached prior to the opening of the valve so that all the joints may be made tight before the passage of oil from the tank to the radiators and after the attachment of the radiators the valves may be opened. Further these valves may be readily opened or closed to cut out certain radiators if it is desired to remove certain radiators. A closure plug 30 is screwed into the opening 29 and forms a seal against leakage from the opening.

It will be noted that the flanged fitting 3 has its screw-threaded portion 14$^a$ of somewhat larger diameter than the extension on the flanged fitting going through the opening in the tank wall. By this construction it is possible to do the expanding of the end 5 of the projection without interfering with the previously formed screw-thread. In making the threads the portion immediately in advance of the threads is bevelled at 14ᵇ, thus making a center for the expanding tool to operate upon.

While I have shown and claimed my device as a transformer cooler it will be understood that this cooler may have other uses.

What I claim as new is:—

1. In a transformer cooler, the combination of a tank having an opening therein surrounded by a seat; a flanged fitting at the opening; a valve carried by the flanged fitting, said valve moving axially and nonrotatively toward and from its seat; and devices on the valve operable for locking the valve in closed position for shipment and for operating the valve in place.

2. In a transformer cooler, the combination of a tank having an opening therein; a radiator; an elbow on the radiator adapted to be detachably connected with the tank, said elbow having a screw-threaded opening in alinement with the opening in the tank; a valve operable to close the opening with the elbow attached or detached; means operable through the opening for actuating the valve; and a plug closing the opening.

3. In a transformer cooler, the combination of a tank having an opening therein; a radiator; an elbow on the radiator adapted to be detachably connected with the tank, said elbow having a screw-threaded opening in alinement with the opening in the tank; a valve operable to close the opening with the elbow attached or detached; and a screw in the opening actuating the valve.

4. In a transformer cooler, the combination of a tank having an opening therein; a radiator; an elbow on the radiator adapted to be detachably connected with the tank, said elbow having a screw-threaded opening in alinement with the opening in the tank; a valve operable to close the opening with the elbow attached or detached; a screw in the opening actuating the valve; and a plug closing the opening.

5. In a transformer cooler, the combination of a tank having an opening therein; a radiator detachably secured to the tank; a valve fitting on the tank; a valve carried by the fitting and closing by an outward movement; a stem on the valve; and a screw-threaded head on the stem adapted to engage securing means with the radiator detached.

6. In a transformer cooler, the combination of a tank having an opening therein; a radiator detachably secured to the tank; a valve fitting on the tank; a valve carried by the fitting and closing by an outward movement; a stem on the valve; a screw-threaded head on the stem adapted to engage securing means with the radiator detached; and a spring tending to close the valve seated on the head.

7. In a transformer cooler, the combination of a tank having an opening therein; a radiator; a flanged fitting secured in the opening; a valve fitting secured in the flanged fitting; a valve seating on the flanged fitting by an upward movement of the valve; a stem on the valve; an elbow fitting secured to flanged fitting forming a connection between the opening and the radiator, said elbow fitting having a screw-threaded opening therein; a screw in the opening operating on the valve stem; a screw plug in the opening; and a spring operating on the stem to close the valve.

8. In a transformer cooler, the combination of a tank having an opening therein; and a flanged fitting having an opening therethrough and a projection extending through the opening in the tank, said flanged fitting having a screw-threaded portion at its outer end of larger diameter than the opening through the fitting and said fitting being expanded at its inner end to secure it within the opening in the tank wall.

In testimony whereof I have hereunto set my hand.

RUDOLPH CONRADER.